F. S. CARR.
FASTENER.
APPLICATION FILED JAN. 16, 1920.

1,387,104.

Patented Aug. 9, 1921.

Inventor:
Fred S. Carr,
by Emery Booth Janney Varney
Attys.

UNITED STATES PATENT OFFICE.

FRED S. CARR, OF NEWTON, MASSACHUSETTS, ASSIGNOR TO CARR FASTENER COMPANY, OF CAMBRIDGE, MASSACHUSETTS, A CORPORATION OF MAINE.

FASTENER.

1,387,104.

Specification of Letters Patent. Patented Aug. 9, 1921.

Application filed January 16, 1920. Serial No. 351,770.

*To all whom it may concern:*

Be it known that I, FRED S. CARR, a citizen of the United States, and a resident of Newton, in the county of Middlesex, Commonwealth of Massachusetts, have invented an Improvement in Fasteners, of which the following description, in connection with the accompanying drawings, is a specification, like characters on the drawings representing like parts.

This invention pertains to improvements in separable fasteners. The present invention is a modification of that shown in United States Letters Patent No. 1,278,799 issued September 10, 1918.

Referring to the drawings:—

Figure 1:
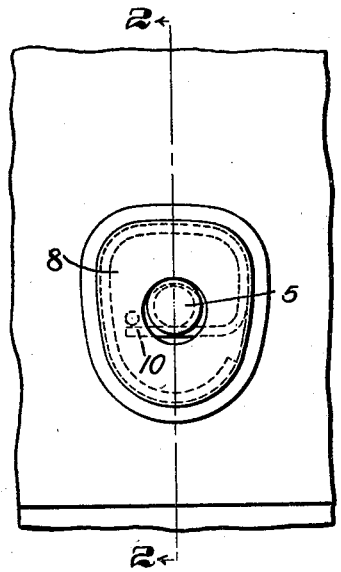
Figure 1 is a front elevation showing a preferred form of one illustrative embodiment of my invention.
Figure 2:
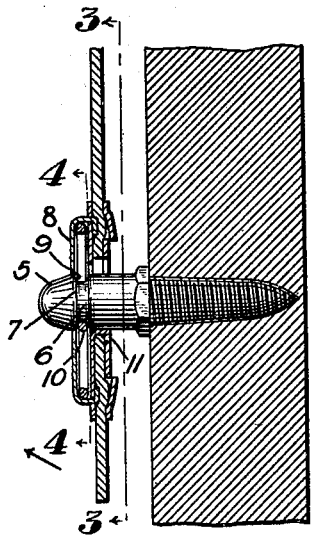
Fig. 2 is a section, partly in elevation, on the line 2—2 of Fig. 1.
Figure 3:
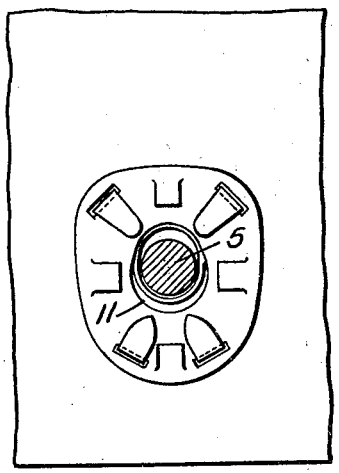
Fig. 3 is a section, partly in elevation, on the line 3—3 of Fig. 2.
Figure 4:
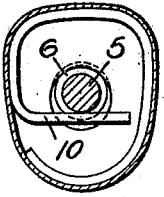
Fig. 4 is a section on the line 4—4 of Fig. 2.

Referring to the drawings and to the preferred form of my invention selected for illustrative purposes, I have shown a fastener comprising a stud having a head 5 and a neck portion 6 providing between them a somewhat sloping shoulder 7, and coöperating with a socket which preferably includes the plate 8 having an aperture therethrough adapted to receive the head of the stud when stud and socket are engaged, and providing adjacent the top of said aperture a lip 9 curved or beveled to fit the slope of the shoulder at the back of the head of the stud. The socket also contains spring means adapted to press the stud toward the lip 9 and, as in the issued patent above referred to, the stud and socket are formed to permit separation when relative tipping movement is effected in the direction indicated by the arrow in Fig. 2.

The operation of the fastener is identical in all respects with that of my issued patent above referred to, except that the ease of disengagement is somewhat increased by the inclination of the lip 9 into conformity or semi-conformity with the shoulder at the back of the head of the stud, and that ease of separation and manufacture is also to some extent facilitated by making that portion of the spring 10, which presses upwardly on the neck of the stud, straight instead of rounded. The holding power and resistance to wear of the fastener is also somewhat increased by the inclining of the lip 9, as well as by the provision of the flange 11 adapted to engage the shank of the stud at the bottom thereof on the side opposite the lip 9. The operation of the fastener is also preferably facilitated, and its holding power increased, by so forming the parts that the portion of the socket herein shown as the lip 11 engaging the under side of the shank of the stud is higher than the bottom lip of the hole through the plate of the socket which provides at its upper side the lip 9.

While I have shown and described a preferred form of one embodiment of my invention, it will be understood that changes involving omission, substitution, alteration and reversal of parts, and even changes in the mode of operation, may be made without departing from the scope of my invention, which is best defined in the following claims.

Claims:

1. A stud and socket fastener comprising, in combination, a stud having a head providing a sloping shoulder and a socket providing opposed jaws, one resilient, the other fixed, positively opposing rectilinear withdrawal of said stud from said socket, while permitting withdrawal thereof when said stud and socket are tipped one relative to the other, said fixed jaw being located above the stud and inclined inwardly and downwardly from the face of the socket.

2. A stud and socket fastener comprising, in combination, a stud having a head providing a sloping shoulder and a socket providing opposed jaws, one resilient, the other fixed, positively opposing rectilinear withdrawal of said stud from said socket, while permitting withdrawal thereof when said stud and socket are tipped one relative to the other, said fixed jaw being located above the stud and inclined inwardly and downwardly from the face of the socket and conforming to the contour of the adjacent part of said sloping shoulder.

3. A stud and socket fastener comprising, in combination, a stud having a head providing a sloping shoulder, said stud being symmetrical throughout the socket engaging portion thereof, and a socket providing opposed jaw means including a fixed jaw positively opposing rectilinear withdrawal of said stud from said socket while permitting withdrawal thereof when said stud and socket are tipped one relative to the other, said fixed jaw being located above the stud and inclined inwardly and downwardly from the face of the socket.

4. A stud and socket fastener comprising, in combination, a stud having a head providing a sloping shoulder and a socket providing a fixed jaw above a stud-receiving aperture in the socket and a coöperating opposed yielding element positively opposing rectilinear withdrawal of said stud from said socket while permitting withdrawal thereof when said stud and socket are tipped one relative to the other, said fixed jaw being inclined inwardly and downwardly from the face of the socket above the stud.

5. A stud and socket fastener providing a stud symmetrical in cross-section, having a neck and a head, in combination with a casing having a front plate and providing a fixed jaw pressed inwardly therefrom and sloping downwardly, a spring jaw opposed to said fixed jaw, said stud having a sloping shoulder for engagement with the fixed jaw to oppose rectilinear withdrawal of the stud from the socket and for engagement with a spring jaw to move said spring jaw away from the fixed jaw on relative tipping of stud and socket to permit withdrawal of the stud from the socket, and an extended lip connected with said socket element engaging the shank of said stud rearwardly of said neck on the opposite side of the stud from said fixed jaw.

In testimony whereof I have signed my name to this specification.

FRED S. CARR.